Feb. 17, 1970 SOHEI OHNO 3,495,456
VARIABLE POSITION TRANSDUCING AND INDICATING MEANS
Filed Jan. 30, 1968
3 Sheets-Sheet 2
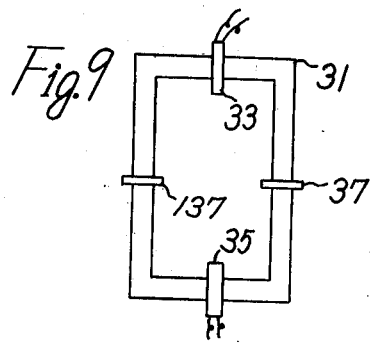
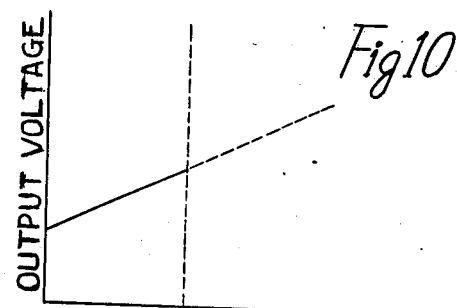
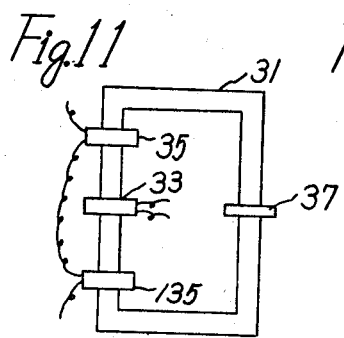
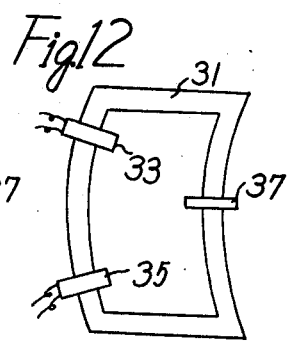
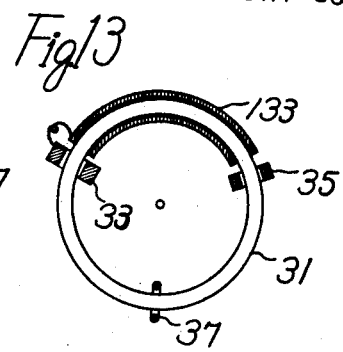
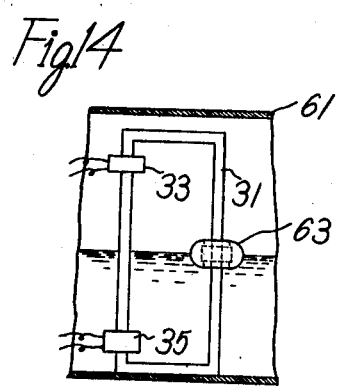
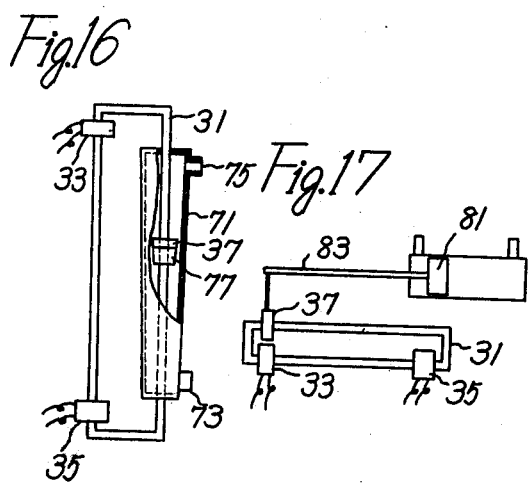
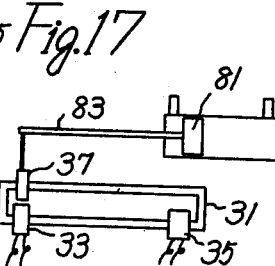
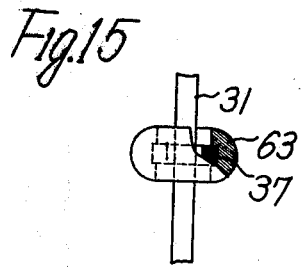
INVENTOR.
SOHEI OHNO
BY
Eyre, Mann & Lucas

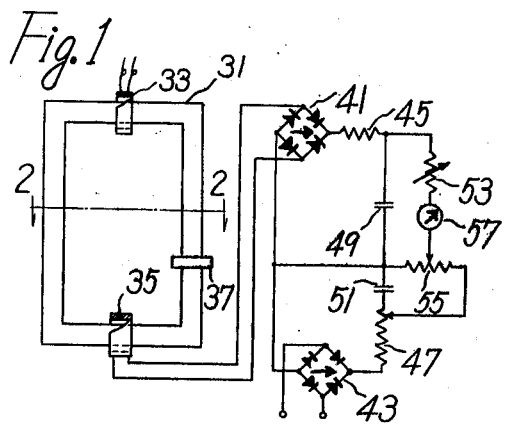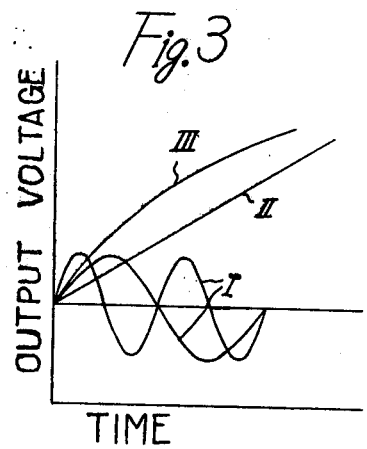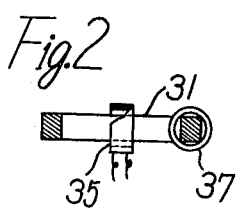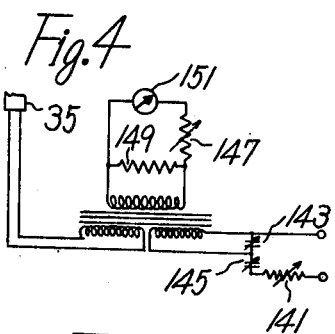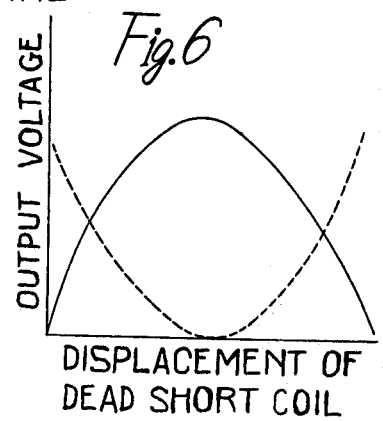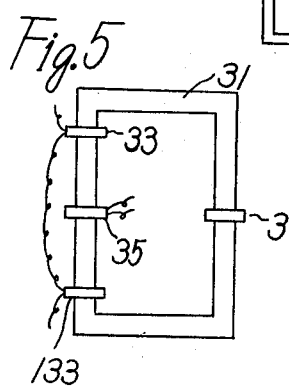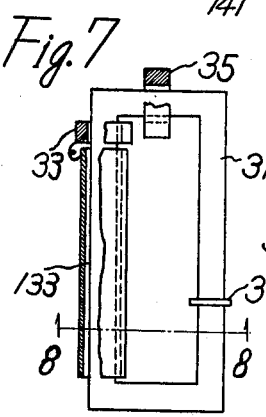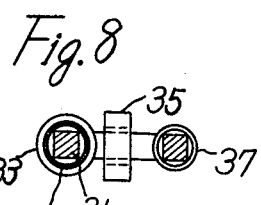

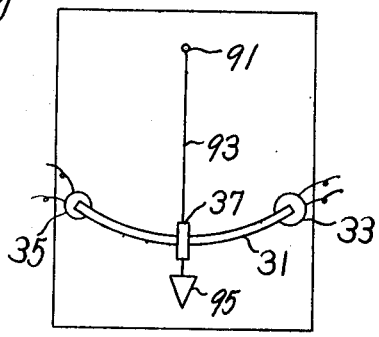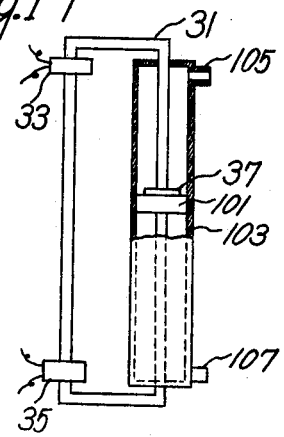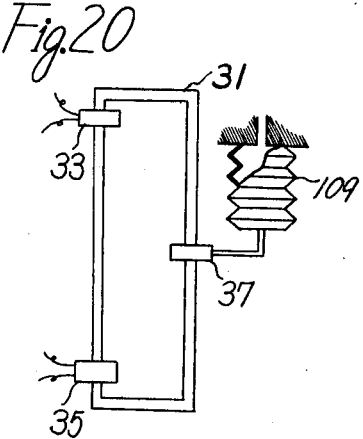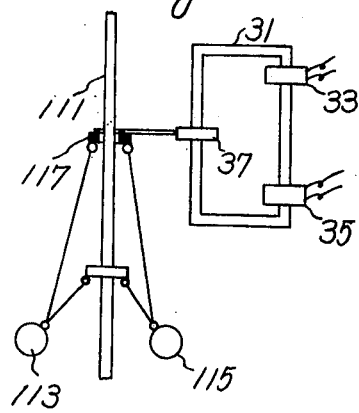

United States Patent Office 3,495,456
Patented Feb. 17, 1970

3,495,456
VARIABLE POSITION TRANSDUCING AND INDICATING MEANS
Sohei Ohno, 67 Chaya, Sumiyoshi-cho,
Higashi-Nada-ku, Kobe, Japan
Filed Jan. 30, 1968, Ser. No. 701,704
Claims priority, application Japan, Mar. 8, 1967,
42/14,597
Int. Cl. G01f 1/04
U.S. Cl. 73—209    8 Claims

ABSTRACT OF THE DISCLOSURE

A transformer which is variable in response to a condition sensing means. The transformer includes a core, a primary, a secondary and a dead short coil surrounding. The position of the dead short coil is variable to change the magnetic coupling of the primary and secondary to provide an indication of the sensed condition. Various mechanisms are disclosed for moving the dead short coil which are responsive to liquid level, fluid flow rate displacement, incline, fluid pressure and shaft rotation speed.

BACKGROUND OF THE INVENTION

Field of the invention

The field of art to which this invention pertains would be the transformer and the electric measurement and indication.

Description of the prior art

In general, the transformer is a device for altering the strength and potential of a current. In this invention, however, the transformer is a device where a variable position is transduced into a variable strength and potential of a current. The differential transformer is a well known device having a similar object with the means in accordance with this invention but having another construction acting on another principle. The differential transformer is restricted in stroke of the variation in input physical signal and also in linearity of the electrical output due to the electric characteristic of the differential transformer so that it is impossible to handle directly an input having a long stroke by the device. In accordance with the system of the differential transformer the displacement as the input physical signal is rendered to the core whereby the mutual inductance of the primary coil and secondary coil is altered.

The potentiometer has also been well known for the similar use with the means in accordance with this invention, which may be useful in either case of the alternating current or direct current and comprises a resistor and a contact which is brought into physical contact with the resistor so as to displace the contact by the action of an input physical signal, and, in turn, to vary the resistance of the resistor. Therefore, the output electrical signal of the potentiometer is not theoretically a continuous linear signal but a stepwise one. In addition, the resistance is affected by the mechanical wear and variation in the sliding friction so that the resistance is not constant.

Other than the well known two prior arts, the synchronous generator and other dynamos and the inductive converter are also useful for the similar use with the means in accordance with this invention. However, the synchronous generator is provided with electrical contacts and the output is such that to be called of a sinusoidal wave form. Conclusively, in accordance with the prior art, it has been impossible to transduce an input physical signal theoretically properly into an output electrical signal.

SUMMARY OF THE INVENTION

Briefly stated in accordance with one aspect of this invention, there is provided a variable position transducing an indicating means comprising a closed magnetic circuit core, at least a magnetic exciting primary coil arranged around the core so as to produce a magnetic flux along the core, at least an inductive secondary coil, at least an inductive dead short coil, and an indicating means. The inductive secondary coil and the inductive dead short coil are arranged around the core and the magnetic flux. The inductive dead short coil is adapted to be displaceable along the core keeping the relation with the magnetic flux. And the indicating means is adapted to indicate a variation in the output of the inductive secondary coil when the inductive dead short coil is displaced.

By virtue of this invention, the variable position transducing and indicating means has the following features, which is itemized below comparing with various means of the class described in accordance with the prior art:

(1) The input physical signal is not given to the core but to the inductive dead short coil, while in the differential transformer such an input physical signal is given to the core.

(2) The variable position transducing and indicating means has not an electrical contact, while the direct current generator and the potentiometer have electrical contacts, respectively.

(3) The variable position transducing and indicating means has not a neutral point, while such a point is inevitable in the differential transformer.

(4.) The output characteristic of the variable position transducing and indicating means is extremely linear and continuous, while those of the potentiometer and the synchronous generator are stepwise and in the form of the sinusoidal wave, respectively.

(5) The variation in the electrical phase angle of the exciting primary coil with respect to the inductive secondary coil is not utilized in the variable position transducing and indicating means in accordance with this invention, while the inductive converter depends upon such a variation.

(6) The rate of variation in time of the input physical signal is not utilized in the variable position transducing and indicating means in accordance with this invention, while such a rate is utilized in a certain kind of the dynamo.

(7) The input physical signal is given to the inductive dead short coil. Such a feature is a unique and novel characteristic of this invention.

Various drawbacks in the various transducers in accordance with the prior art are overcome due to the provision of the above-stated characteristics in the variable position transducing and indicating means in accordance with this invention.

The variable position transducing and indicating means may be united with various instruments for measuring and indicating various input physical signals, respectively, in accordance with this invention. Such instruments are liquid level indicators, current meters, displacement indicators, inclinometers, manometers, pressure gauges, tachometers, etc.

Brief description of the drawing

The invention will be better understood and other objects and additional advantages of the invention will become apparent upon perusal of the following description in connection with the drawings, in which:

FIG. 1 is a partly diagrammatical front view and partly connection diagram of a most basic embodiment of this invention;

FIG. 2 is a cross-sectional view taken along the line 2—2 of FIG. 1;

FIG. 3 is a diagrammatic view illustrating some wave forms of the outputs of the transducer in accordance with this invention;

FIG. 4 is a connection diagram of another indicating means to be connected with the transducer in the variable position transducing and indicating means in accordance with this invention;

FIG. 5 is a diagrammatical front view of a transducer embodying this invention, in which two magnetic exciting primary coils are provided;

FIG. 6 is a diagrammatic view illustrating interrelations of the outputs of the transducer to the positions of the inductive dead short coil shown in FIG. 5;

FIG. 7 is a diagrammatical front view of a transducer embodying this invention, which is also provided with two magnetic exciting primary coils but differently arranged from the preceding embodiment;

FIG. 8 is a cross-sectional view taken along the line 8—8 of FIG. 7;

FIG. 9 is a diagrammatical front view of a transducer embodying this invention, in which two inductive dead short coils are provided;

FIG. 10 is a diagrammatic view illustrating the output of the transducer shown in FIG. 9;

FIG. 11 is a diagrammatical front view of a transducer embodying this invention, in which two inductive secondary coils are provided;

FIG. 12 is a diagrammatical front view of a transducer embodying this invention, in which the closed iron core has curved parts;

FIG. 13 is a diagrammatical front view of a transducer embodying this invention, in which the closed iron core is a ring;

FIG. 14 is a diagrammatical front view of a fluid liquid level indicator in which a transducer is united in accordance with this invention;

FIG. 15 is an enlarged view showing a float in the liquid level indicator shown in FIG. 14;

FIG. 16 is a diagrammatical front view of a current meter in which a transducer is united in accordance with this invention;

FIG. 17 is a diagrammatical front view of a displacement meter in which a transducer is united in accordance with this invention;

FIG. 18 is a diagrammatic front view of an inclinometer in which a transducer is united in accordance with this invention;

FIG. 19 is a diagrammatical front view of a pressure gauge in which a transducer is united in accordance with this invention;

FIG. 20 is a diagrammatical front view of another pressure gauge in which a transducer is united in accordance with this invention; and FIG. 21 is a diagrammatical front view of a tachometer in which a transducer is united in accordance with this invention.

Similar numerals refer to similar parts throughout the several views.

DESCRIPTION OF THE PREFERRED EMBODIMENTS

Referring more particularly to the drawings, the preferred embodiments of this invention will now be described; however, this description will be understood to be illustrative of the invention and not as limiting it to the particular constructions, arrangement and applications shown and described.

Example 1

In the most basic embodiment shown in FIGS. 1 and 2, the embodied variable position transducing and indicating means comprises a transducer and an indicating means. The transducer comprises a closed iron core 31. The core 31 shown in FIGS. 1 and 2 is a parallelopiped. However, it is also possible to form a core in other forms as described hereinafter. In any event, it is necessary that the core has at least a part having a constant curvature. In case of the parallelopiped, there are of, of course, four rectilinear parts which are considered a kind of the constantly curved part having a curvature of zero. Around the core 31 is provided a magnetic exciting primary coil 33 which has predetermined windings and a suitable electrically exciting means (not shown) so as to excite the core 31. Around the core 31 is also provided an inductive secondary coil 35 which has predetermined windings and is electrically connected with the indicating means. The magnetic exciting primary oil 33 and the inductive secondary coil 35 are fixedly mounted around the core 31 and it is necessary to arrange the latter around the magnetic flux produced by the former in the core 31.

There is further provided a tertiary coil 37 which is to be named inductive dead short coil. This inductive dead short coil 37 is simply constructed: it consists of simple windings or one turn winding, of which both ends are connected with each other. It is preferred that it is very light. It is most essential that it is possible to displace the inductive dead short coil 37 along the linearly straight part of the core 31 with a minimized friction while keeping the relation to the magnetic flux produced by the magnetic exciting primary coil 33 constant other than the longitudinal displacement.

Upon magnetically combining these elements by giving pertinent electric and magnetic loadings to them, when the inductive dead short coil 37 is displaced along the straight part of the core 31, the degree of magnetic coupling of the primary coil 33 and that of the secondary coil 35 are changed. In accordance therewith, the output of the secondary coil 35 is changed in voltage. For example, when the inductive dead short coil 37 approaches the magnetic exciting primary coil 33, the output of the inductive secondary coil 35 decreases in voltage corresponding to the displacement. The internal resistance of the closed iron core 31 is utilized by converting the same into a magnetomotive force for the displaceable dead short coil 37 so that it is necessary to provide a long magnetic path along the closed iron core 31. This fact is a characteristic of the transducer in accordance with this invention, while, on the contrary, it is desirable to minimize the length of the magnetic path in the general conventional transformer.

By connecting the output of the inductive secondary coil 35 with an indicating means comprising a circuit as shown in FIG. 1, it is possible to indicate the displacement of the inductive dead short coil 37 as the output characteristic of the inductive secondary coil 35. When the inductive dead short coil 37 has a simple harmonic motion, the output of the secondary coil 35 may be illustrated as a sinusoidal wave as denoted by I in FIG. 3. When the inductive dead short coil 37 is displaced at a constant speed, the output of the secondary coil 35 may be illustrated rectilinearly as a line II in FIG. 3. When the inductive dead short coil 37 has a varying speed, the indication of the output of the inductive secondary coil 35 becomes a curve, for example, as shown in FIG. 3 by a curve III. As far as the displacement of the inductive dead short coil 37 is continuous, the electric quantity of the output of the inductive secondary coil 35 keeps a linearly functional relation with the quantity of the displacement so that the output is continuous and has not a hysteresis.

The indicating circuit as shown in FIG. 1 comprises two rectifying circuits 41, 43, one resistor 45, two capacitors 49, 51, three variable resistors 47, 53, 55 and a measuring and indicating instrument 57. This indicating circuit itself is not novel so that a detailed explanation thereof would not be necessary.

The indicating circuit shown in FIG. 1 may be replaced by another circuit, for example, as shown in FIG. 4, which comprises a transformer, of which primary circuit provided with a variable resistor 141 and two variable condensers 143 and 145, is connected with the inductive secondary coil 35. The secondary circuit of the transformer is connected with a fixed resistor 149, a variable resistor 147 and an ammeter 151 as a measuring and indicating instrument.

Example 2

When the transducer in accordance with this invention is constructed and arranged as shown in FIG. 5, in which the magnetic exciting primary coil is divided into two coils 33 and 133 between which the inductive secondary coil 35 is arranged, parabolic curves are obtained as the output characteristics of the secondary coil 35 in accordance with a displacement of the inductive dead short coil 37 displaceable along a straight part of the core 31 in accordance with an input physical signal. There are two manners in arranging two magnetic exciting primary coils 33 and 133. In case where the windings of the two coils 33 and 133 are arranged in the same direction with each other so that they have the additive polarity, the parabolic curve for the output characteristic for the dead short coil 37 has the maximum point at the center of the stroke of the displacement. In case where the two primary coils 33 and 133 are oppositely wound so that the polarity is subtractive, the parabolic curve is inverted, of which the center becomes the minimum point, as shown in FIG. 6.

Example 3

In Example 3 shown in FIGS. 7 and 8, the magnetic exciting primary coil is divided into two coils 33 and 133 connected with each other in series. One coil 33 has a concentrated multiplex winding and the other coil 133 has few layers of winding. In this arrangement, the concentrated multiplex winding 33 serves for adjusting the quantity of magnetic flux along the magnetic path. It is necessary that the few layers of winding 133 occupy almost all length of a part of the closed iron core 31, which part is opposite to the rectilinear part thereof along which the inductive dead short coil 37 is displaceable, whereby any occurrence of variation in magnetic potential in the last-named rectilinear part is prevented.

The magnetic flux produced in the magnetic path is in proportion to the magnetomotive force of the few layers of winding 133 and oppositely proportional to the total resistance of the magnetic path of the core 31. The height of the magnetic potential in the closed iron core 31 other than such a part as covered by the magnetic exciting primary coil 33 is substantially constant, and a certain strength of the counter magnetomotive force is distributed throughout such a part as having a substantially constant magnetic potential. Therefore, an electrical current whose intensity and voltage depend upon the structure of the few layers of winding 133 of the primary coil and the secondary coil 35, is produced in the secondary coil 35 by the action of the counter magnetomotive force, which does not relate to the positions of the inductive secondary coil 35 and the inductive dead short coil 37 with respect to the few layers of winding 133 along the core 31. However, the magnitude in magnetic coupling of the inductive secondary coil 35 and the exciting primary coils 33 and 133 with the inductive dead short coil 37 is inversely proportional to the relative distance therebetween along the core 31 so that the electrical output of the secondary coil 35 is controlled by the displacement of the dead short coil 37.

Example 4

In Example 4 shown in FIG. 9, the inductive dead short coil is divided into two coils 37 and 137 and arranged around two rectilinear parts of the single closed iron core 31, respectively. The variation in output voltage of the inductive secondary coil 35 represents a combination of variations in positions of the two inductive dead short coils 37 and 137. By virtue of this arrangement, it is possible to control a signal representing displacement of the dead short coil 37 by the other signal representing displacement of the other dead short coil 137. The former displacement may be proportionated to variation in, for example, specific gravity and the latter displacement may be proportionated to variation in, for example, temperature. FIG. 10 illustrates a case where at first the dead short coil 37 is displaced and thereafter the other dead short coil 137 is displaced.

Example 5

In Example 5 shown in FIG. 11, the inductive secondary coil is divided into two coils 35 and 135 so as to obtain two outputs, of which a combination corresponds to the variation in position of the single dead short coil 37 and is illustrated by parabolic curves similarly to the cases shown in FIG. 6.

Example 6

In Example 6 shown in FIG. 12, the closed iron core 31 comprises four parts, two parts thereof oppositely arranged with each other being rectilinear and the other two parts being curved similarly with each other. The curvature of the curved parts is constant. The inductive dead short coil 37 is arranged around one of the two curved parts so that the variation in position thereof occurs along the curve. Such arrangement is useful in some applications where the input physical signal varies its position along such a curve as described hereinafter for such application.

Example 7

In Example 7 shown in FIG. 13, the closed iron core 31 is a ring. Along the ring or circular core 31 are arranged the magnetic exciting coil comprising a coil of a concentrated multiplex winding 33 and a coil of few layers of winding 133 connected with the former in additive relation, an inductive secondary coil 35, and an inductive dead short coil 37 in the similar manner to Example 3. The dead short coil 37 is adapted to be displaced along a curve having a constant curvature similarly to the preceding example.

The variable position transducing and indicating means will now be described in the form of being applied to and united with various instruments for measuring and indicating various variable quantities.

Example 8

In FIGS. 14 and 15, a liquid level indicator, for example, a gasoline gauge, is shown. A closed iron core 31 is fixed inside a tank 61 and a rectilinear part of the core 31 is arranged normally to the upper surface of a liquid contained in the tank 61. An inductive dead short coil 37 is united with a float 63 in such a manner that it is possible to displace the dead short coil 37 as it is fixedly united with the float 63 in accordance with any variation in level of the liquid. By virtue of this combination of the transducer and the float, it is possible to measure the variation in level of the liquid as an electrical output of the inductive secondary coil 35 which may be indicated outside the tank 61 while keeping the same fluidtight.

Example 9

In FIG. 16, a fluid current meter in accordance with this invention is illustrated. A vertically rectilinear part of the parallelopiped closed iron core 31 is confined inside of an inverted frusto-conical tube 71 and arranged liquidtightly through which the core 31 is extended. An inlet 73 for a liquid of which the current is to be measured and an outlet 75 therefor are provided near the bottom and the top ends of the tube 71, respectively. Inside the tube 71 and around the core 31 is arranged an inductive dead short coil 37 fixedly united with a suitable counterweight 77. In operation, the liquid is let flow through the inlet 73 and upwards inside the tube 71. The dead short coil 37 is displaced upwards by the action of the upward flow of the liquid relating to the current, so that the current may be measured and indicated by the indicating means in the form of the electrical output of the inductive secondary coil 35.

Example 10

In FIG. 17, an arrangement in which the displacement of a piston 81 is measured and indicated is illustrated. A piston rod 83 fixed to the piston 81 is united with an inductive dead short coil 37 by means of a suitable mechanism so that the displacement of the piston 81 is represented by the displacement of the dead short coil 37 arranged displaceable along the rectilinear part of the core 31. It is also necessary that the rectilinear part is arranged in parallel with the piston rod 83. By virtue of this arrangement, it is possible to indicate the displacement of the piston 81 electrically in the indicating means disposed remotely from the piston 81.

Example 11

A kind of the inclinometer is illustrated in FIG. 18, in which the variable position transducing and indicating means is united in accordance with this invention. In case where the inclination of a vertical line is variable within a vertical plane, the inclination is measured and indicated by this inclinometer. A constantly curved part of the closed iron core 31 and the center 91 of the curvature is fixedly positioned within the vertical plane and an inductive dead short coil 37 is arranged displaceably along the curved part. An arm 93 is pivoted at the center 91 and fixed with the dead short coil 37 below which a weight 95 is provided. The variation in inclination of the arm 93 within the vertical plane is measured and indicated electrically by an indicating means.

Example 12

FIG. 19 shows a manometer or a pressure differential indicator in accordance with this invention. A ring 101 is reciprocatable in a cylinder 103 which encircles a rectilinear part of a closed iron core 31 concentrically therewith. The both ends of the cylinder 103 are closed in a fluidtight manner and provided with inlets 105 and 107, respectively. The ring piston 101 is united with an inductive dead short coil 37. In operation, two pressured fluids are admitted into the two inlets 105 and 107, respectively. The difference in pressure of the two fluids acts on the piston 101 so as to displace the piston 101 along the iron core 31. This displacement or variation in position may be measured and indicated electrically as the output of an inductive secondary coil 35.

Example 13

FIG. 20 shows another pressure gauge in accordance with this invention, in which a bellow 109 is provided. An end and the other end of the bellow 109 are fixed to a closed iron core 31 and an inductive dead short coil 37, respectively. It is necessary to arrange the bellow 109 in such a manner that the same may operate in parallel with the rectilinear part of the iron core 31. This instrument is operated by admitting a pressured fluid inside the bellow 109 whereby the dead short coil 37 is displaced so as to measure and indicate the pressure of the fluid as the electrical output of an inductive secondary coil 35.

Example 14

FIG. 21 shows a tachometer in accordance with this invention. A spindle 111 driven by a shaft whose speed is to be measured is provided with two fly-weights 113 and 115 and an idle ring 117 as conventional in the well known construction of the instrument of the class described. In accordance with this invention, the idle ring 117 is fixed with a dead short coil 37 displaceable along a rectilinear part of a closed iron core 31. It is necessary to arrange the rectilinear part in parallel with the spindle 111. In operation, when the spindle 111 is rotated, the fly-weights 113 and 115 are displaced away from the axis of rotation whereby the idle ring 117 is displaced along the spindle 111 by virtue of connecting links provided therebetween and the dead short coil 37 is, in turn, displaced along the iron core 31 so that the variation in rotational speed is measured and indicated as the electrical output of an inductive secondary coil 35.

While particular embodiments of the invention have been illustrated and described, further modifications thereof will readily occur to those skilled in the art.

What is claimed as new and desired to be secured by Letters Patent of the United States is:

1. A variable position transducing and indicator means comprising:
    (a) a closed magnetic core having a magnetic permeability substantially greater than air surrounding an air gap therein
    (b) at least one magnetic exciting primary coil arranged around said core
    (c) means for supplying electric current to said coil
    (d) at least one inductive secondary coil arranged around said core and magnetic flux to provide an electric output in response to said flux
    (e) said inductive secondary coil being positioned in spaced relationship to said primary coil
    (f) the distance between said primary and secondary coil on at least one side of the core being at least equal to one-half of the total length of the core that extends between the said coils to provide a relatively long magnetic flux path in the core between said coils
    (g) at least one inductive dead short coil slidably mounted around said core in the said long magnetic flux path said core having a substantially uniform cross sectional area in the said long flux path
    (h) a mechanism having a movable part therein
    (i) means for connecting said dead short coil to said movable part of the mechanism
    (j) said connecting means being adapted to slide the said dead short coil along the core in response to movement of said moveable part of the mechanism whereby the electric output of said secondary coil is changed in response to movement of the dead short coil, and
    (k) an indicator connected to said secondary coil which is adapted to respond to a change in the output of the secondary coil.

2. A structure as specified in claim 1 in which the said mechanism is a liquid level indicator having the said core positioned therein and in which the said moveable part of the mechanism is a liquid level float that moves in response to change in the liquid level.

3. A structure as specified in claim 1 in which the said mechanism is a fluid current meter having that portion of the core that carries the dead short coil positioned therein, and in which the moveable part is a counterweight that moves in response to fluid flowing through said mechanism.

4. A structure as specified in claim 1 in which the mechanism is a displacement meter and in which the moving part is adapted to reciprocate as a function of said meter.

5. A structure as specified in claim 1 in which the mechanism is an inclinometer to which said core is attached to move therewith and in which the movable part is an arm adapted to remain substantially stationary in a vertical position when the meter is inclined whereby the dead short coil and arm are caused to move relative to the core.

6. A structure as specified in claim 1 in which the mechanism is a manometer having a cylinder with that portion of the core that carries the dead short coil positioned therein, and in which the moveable part is a piston slidably mounted in said cylinder to reciprocate in response to the pressure to be measured and indicated.

7. A structure as specified in claim 1 in which the mechanism is a manometer and in which the movable part is a bellows.

8. A structure as specified in claim 1 in which the mechanism is a tachometer and in which the moveable part is adapted to reciprocate in response to change in speed of the tachometer.

References Cited

UNITED STATES PATENTS

| | | | |
|---|---|---|---|
| 1,171,480 | 2/1916 | Troll | 336—75 X |
| 2,089,926 | 8/1937 | Norris | 336—75 |
| 2,569,106 | 9/1951 | James et al. | 73—313 X |
| 2,408,770 | 10/1946 | Frische | 330—30 X |
| 2,620,661 | 12/1952 | Roux | 73—419 X |
| 2,774,057 | 12/1956 | Jones | 336—30 X |
| 2,986,714 | 5/1961 | Smith | 336—75 X |
| 3,020,527 | 2/1962 | MacLaren | 336—75 X |
| 3,128,625 | 4/1964 | Heineman | 73—313 X |
| 3,161,842 | 12/1964 | Master | 336—75 |

FOREIGN PATENTS 25,919   1913   Great Britain.

S. CLEMENT SWISHER, Primary Examiner

U.S. Cl. X.R.

33—215; 73—313, 398, 535; 336—30, 75